(12) United States Patent
Shoshan et al.

(10) Patent No.: US 10,169,109 B2
(45) Date of Patent: Jan. 1, 2019

(54) SWITCHED APPLICATION PROCESSOR APPARATUS FOR CELLULAR DEVICES

(75) Inventors: Yaakov Shoshan, Ashkelon (IL); Gil Koifman, Petach-Tikva (IL); Yigal Bitran, Ramat Hasharon (IL)

(73) Assignee: ELTA SYSTEMS LTD., Ashdod (IL)

( * ) Notice: Subject to any disclaimer, the term of this patent is extended or adjusted under 35 U.S.C. 154(b) by 1147 days.

(21) Appl. No.: 13/812,097

(22) PCT Filed: Jul. 21, 2011

(86) PCT No.: PCT/IL2011/000587
§ 371 (c)(1),
(2), (4) Date: Oct. 2, 2013

(87) PCT Pub. No.: WO2012/014194
PCT Pub. Date: Feb. 2, 2012

(65) Prior Publication Data
US 2014/0018125 A1    Jan. 16, 2014

(30) Foreign Application Priority Data

Jul. 25, 2010 (IL) .......................................... 207180

(51) Int. Cl.
*G06F 9/54* (2006.01)
*H04W 4/00* (2018.01)
*H04W 88/06* (2009.01)
*H04B 1/3827* (2015.01)

(52) U.S. Cl.
CPC ............. *G06F 9/54* (2013.01); *H04B 1/3833* (2013.01); *H04W 4/00* (2013.01); *H04W 88/06* (2013.01)

(58) Field of Classification Search
CPC combination set(s) only.
See application file for complete search history.

(56) References Cited

U.S. PATENT DOCUMENTS

| 7,672,236 B1 * | 3/2010 | Karunakaran ...... H04L 12/4625 |
| | | 370/230.1 |
| 2005/0073977 A1 | 4/2005 | Vanghi et al. |
| 2005/0184993 A1* | 8/2005 | Ludwin ................ G09G 3/3611 |
| | | 345/502 |
| 2007/0103876 A1 | 5/2007 | Huang et al. |

(Continued)

FOREIGN PATENT DOCUMENTS

WO    2007/054849 A2    5/2007

OTHER PUBLICATIONS

European Search Report dated Jun. 22, 2015 for European Application No. 11811928.8.

*Primary Examiner* — Yuwen Pan
*Assistant Examiner* — Zhitong Chen
(74) *Attorney, Agent, or Firm* — Paul D. Bianco; Gary S. Winer; Fleit Gibbons Gutman Bongini & Bianco PL

(57) ABSTRACT

A cellular device architecture, including two application processors connectible through a Modem-AP Switch to two modems, each communicating with a respective antenna. A Controller module coupled to the switch and being configured, in response to receipt of data received in the Modem-AP switch as received through an antenna, to command the switch to select a processing route, whereby one of the application processors is switched to connect to one of the modems and to its associated antenna.

35 Claims, 8 Drawing Sheets

(56) References Cited

U.S. PATENT DOCUMENTS

| | | | |
|---|---|---|---|
| 2007/0153723 A1* | 7/2007 | Souissi | H04L 45/00 370/328 |
| 2008/0072014 A1 | 3/2008 | Krishnan et al. | |
| 2008/0291906 A1 | 11/2008 | Chigurupati et al. | |
| 2008/0311912 A1* | 12/2008 | Balasubramanian | H04W 48/18 455/436 |
| 2009/0069050 A1* | 3/2009 | Jain | G06K 19/07739 455/558 |
| 2009/0083803 A1 | 3/2009 | Alshaykh et al. | |
| 2009/0248913 A1* | 10/2009 | Salokannel | G06F 13/385 710/33 |
| 2009/0325615 A1 | 12/2009 | McKay et al. | |
| 2010/0009716 A1* | 1/2010 | Lee | H04W 4/20 455/558 |
| 2010/0113090 A1 | 5/2010 | Lin et al. | |
| 2010/0291911 A1* | 11/2010 | Kraft | G06F 3/0482 455/418 |
| 2011/0051858 A1 | 3/2011 | Salvekar et al. | |
| 2011/0191484 A1* | 8/2011 | Babbar | G06F 9/5011 709/228 |

* cited by examiner

SWITCHED APPLICATION PROCESSOR APPARATUS FOR CELLULAR DEVICES

FIELD OF THE INVENTION

This invention relates to switching architecture for use in cellular devices.

BACKGROUND OF THE INVENTION

Mobile phones typically employ an Application Processor coupled to two or more Appliances (such as keyboard, display, microphone, speaker, etc.) and to two or more Modems and associated RF Front-ends (for communicating, e.g., in either 3G or 4G cellular standards).

Attention is drawn to FIG. 1 illustrating schematically an exemplary prior art mobile telephone system architecture 100. As shown, the system 100 includes the two antennae 101 and 102 and associated modems 103 and 104 (e.g., operating in either 3G or 4G cellular standards) both coupled to application processor 105, which in turn is coupled to a plurality of appliances. Depending on various criteria, such as the selected appliance by the user and the required communication constraints (say 3G or 4 G communication), the application processor 105 communicates to the appropriate modem and the appropriate appliance.

Implementation of a single application processor connected to two RF front ends and modems is presented in PCT/IB2006/053982, which discloses a miniaturized form factor card that provides a communication system for mobile information devices having an applications processor and user interface components. A receiving frame is provided in the mobile information device and an insertable miniaturized form factor card incorporating means for RF transmission and reception and a wireless modem and having an indexing connector that is received in a mating moiety in the receiving frame. The applications processor and the user interface components in the mobile information device are interconnected to digital functions of the wireless modem and means for RF transmission and reception through the connector. Additionally, the miniaturized form factor card further includes a power management function interfacing with the applications processor and user interface components through the connector.

The prior art introduced also employs utilization of more than one application processor. In example, US 2008/0072014 discloses a mobile computing device with multiple modes, such as wireless communication and personal computing, which has an application processor and a communication processor. In the computing mode, the application processor is the master processor. In the communication mode, the application processor is deenergized to conserve battery power, with the communication processor functioning as the master processor by accessing the device's peripheral bus using the memory interface of the communication processor.

There is a need in the art for a new cellular device architecture and apparatus employing at least two application processors that are alternatingly used and in addition that are strictly and physically separated.

SUMMARY OF THE INVENTION

In accordance with an aspect of the invention, there is provided a cellular device architecture, comprising:

two application processors connectible through a Modem-AP Switch to at least two modems each communicating with a respective antenna, a Controller module coupled to at least the switch and being configured, in response to receipt of data received in the Modem-AP switch as received through an antenna, to command the switch to select a processing route wherein one of the application processors is switched to connect to one of the modems and to its associated antenna.

In accordance with an embodiment of the invention, there is provided a device wherein the two processors are further connectible through an AP-Appliance Switch to at least two appliances and wherein the Controller module is coupled to at least the switches and is configured, in response to receipt of data received in the AP-Appliance Switch as originated from an appliance or receipt of data in the Modem-AP switch as received through an antenna, to command either or both of the switches to select a processing route wherein one of the application processors is switched to connect to one of the modems and to its associated antenna, and to at least one of the appliances.

In accordance with a further embodiment of the invention, there is provided a cellular device architecture wherein the Controller is configured to command the Modem-AP Switch to select a processing route wherein one of the application processors is switched to connect to one of the modems and to its associated antenna.

In accordance with a further embodiment of the invention, there is provided a cellular device architecture wherein the Controller is configured to command the AP-Appliance Switch to select a processing route wherein one of the application processors is switched to connect to at least one of the appliances.

In accordance with a further embodiment of the invention, there is provided a cellular device architecture wherein at least one of said modems and its associated antenna is configured to operate in 4G protocol.

In accordance with a further embodiment of the invention, there is provided a cellular device architecture wherein at least one of the modems and its associated antenna is configured to operate in 3G protocol.

In accordance with a further embodiment of the invention, there is provided a cellular device architecture wherein at least one of the modems and its associated antenna is configured to operate in 2G/GSM protocol.

In accordance with a further embodiment of the invention, there is provided a cellular device architecture wherein the cellular device is a mobile phone.

In accordance with a still further embodiment of the invention, there is provided a cellular device architecture wherein at least one of the application processors is associated with an additional pre-processing application processor that forms part of the processing route that includes the one application processor.

In accordance with a further embodiment of the invention, there is provided a cellular device architecture wherein one of the application processors is adapted for sensitive bank transactions and wherein in response to received data that pertains to sensitive bank transactions, the Controller module is configured to select a processing route that includes the bank application processor.

In accordance with a still further embodiment of the invention, there is provided a cellular device architecture wherein the bank application processor is associated with a pre-processing firewall application processor.

In accordance with a further embodiment of the invention, there is provided a cellular device wherein the data in the appliance switch, as originated from an appliance, includes at least one of the following: phone number, session type, payload type and any internal payload information.

In accordance with a further embodiment of the invention, there is provided a device wherein the data in the Modem-AP Switch, as received from the associated antenna, includes modem type, session type, and source identity.

In accordance with a further embodiment of the invention, there is provided a device wherein the modem type includes at least one of the following: WiFi, Bluetooth, 2G, 3G, 4G.

In accordance with a further embodiment of the invention, there is provided a device wherein the session type includes at least one of the following: voice-call, SMS, data.

In accordance with a further embodiment of the invention, there is provided a device wherein the source identity includes a telephone number.

In accordance with a further embodiment of the invention, there is provided a cellular device architecture wherein an additional application processor and Modem-AP Switch and Pre-processor application and AP-Appliances Switch and Controller module are implemented as an add-on separate unit connectible to a cellular device.

In accordance with a further embodiment of the invention, there is provided a cellular device architecture, wherein the Modem-AP switch includes a modem handler configured to connect to at least one modem and is adapted to implement an interface to the at least one modem connected thereto.

In accordance with a further embodiment of the invention, there is provided a cellular device architecture, wherein the interface includes control signals and traffic signals.

In accordance with a further embodiment of the invention, there is provided a cellular device architecture, wherein the Modem Handler supports the Controller to connect one of said modems by means of modem selector, in response to commands received from the modems.

In accordance with a further embodiment of the invention, there is provided a cellular device architecture, wherein the Modem-AP switch includes an Application Processor Handler configured to connect to at least one application processor and is adapted to implement an interface to the at least one application processor connected thereto.

In accordance with a further embodiment of the invention, there is provided a cellular device architecture, wherein the interface includes command and control signals that the application processor send to or receive from said modems.

In accordance with a further embodiment of the invention, there is provided a cellular device architecture, wherein the Application Processor Handler is configured to connect one of the specified application processors by means of Application Processor Selector in response to commands received from the Controller module.

In accordance with a further embodiment of the invention, there is provided a cellular device architecture, wherein the switch includes an Application Processor Handler configured to connect to at least one application processor and is adapted to implement an interface to the at least one application processor connected thereto; and wherein, based on either the data received from the Modem Handler and/or data received from Application Processor Handler, the controller module being configured to command either or both of the modem selector or AP selector to connect a given modem to a given application processor, thereby forming a selected processing route.

In accordance with a further embodiment of the invention, there is provided a cellular device architecture, wherein data as received from the modem handler being a session type as received from the modem.

In accordance with a further embodiment of the invention, there is provided a cellular device architecture, wherein data as received from the modem handler being the operating modem indication or any identity type of an incoming session.

In accordance with a further embodiment of the invention, there is provided a cellular device architecture, wherein data as received by the Controller module from the Application Processor Handler being of a type selected from a group that includes application type, active application processor indication and service priority level.

In accordance with a further embodiment of the invention, there is provided a cellular device architecture, wherein the AP-Appliance switch includes an application processor handler configured to connect to at least one application processor and is adapted to implement an interface to the at least one application processor connected thereto.

In accordance with a further embodiment of the invention, there is provided a cellular device architecture, wherein the AP-Appliance switch includes an Application Handler configured to connect to at least one appliance and is adapted to implement an interface to the at least one application processor connected thereto.

In accordance with a further embodiment of the invention, there is provided a cellular device architecture, wherein based on data received from the Application Processors Handler and/or based on data received from the Appliances Handler, the Controller module is configured to select an appropriate application processor and appliances that form part of the processing route.

In accordance with a further embodiment of the invention, there is provided a cellular device architecture, wherein said selection of an application processor takes into account, in a coordinated fashion, data retrieved from said handlers.

In accordance with an aspect of the invention, there is provided in a cellular device architecture that includes two application processors connectible through a Modem-AP Switch to at least two modems each communicating with a respective antenna, a method for selecting a processing route, comprising (a) in response to receipt of data in said Modem-AP switch, as received through an antenna, commanding the switch to select a processing route wherein one of said application processors is switched to connect to one of the modems and to its associated antenna and to at least one of the appliances.

In accordance with an embodiment of the invention, there is provided a method wherein the processors are further connectible through an AP-Appliance Switch to at least two appliances and wherein in response to receipt of data in said AP-Appliance Switch, as originated from an appliance or receipt of data in the Modem-AP switch as received through an antenna, commanding either or both of the switches to select a processing route wherein one of the application processors is switched to connect to one of the modems and to its associated antenna and to at least one of the appliances.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Note that the description below refers to cellular devices. Typical, yet not exclusive, examples of cellular devices are mobile telephone, laptop dongle facilitating access of laptop to cellular network, laptop connectible to cellular networks and/or any device that can form part of a cellular network.

Note also that the description below refers to a switch. The invention is not bound by any specific structure of a switch, which can be, for example, any of physical (e.g., relays) or logical (whether analog or digital) switching devices.

The term application processor refers to a processor configured to run any desired application, such as by way of specific example bank related applications, video conferencing and/or any other desired application.

The term "processor" should not be construed as a single processor, and accordingly any known architecture of processor, whether single or multi, parallel distributed and or any other known architecture, is applicable The description below is provided with reference to distinct system architectures (in FIGS. 2-5 and 8). The invention is by no means bound to the specified architectures and/or to the specific block included in each architecture.

The description below is provided with reference to distinct flow diagram (in FIGS. 6 and 7). The invention is by no means bound to the specified stages included in each flow diagram.

Figure 1:
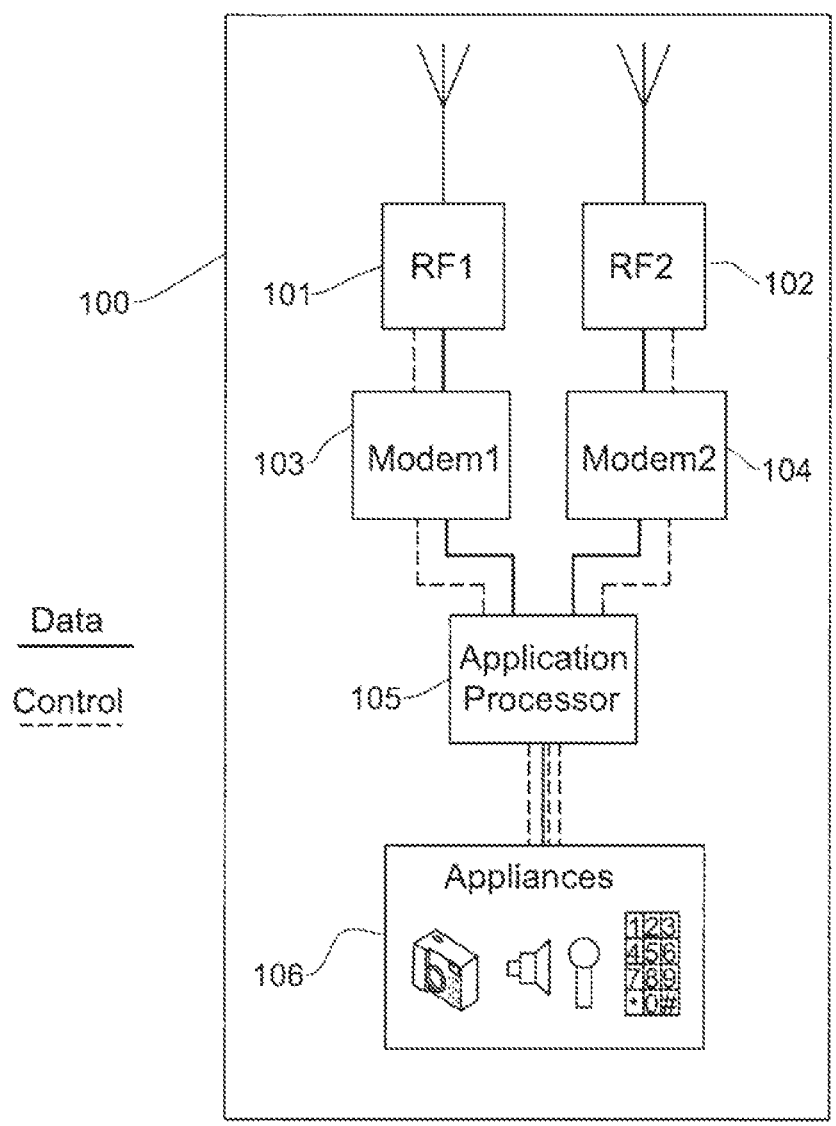
FIG. 1 is a schematic illustration of a prior art typical cellular device system architecture.
Figure 2:
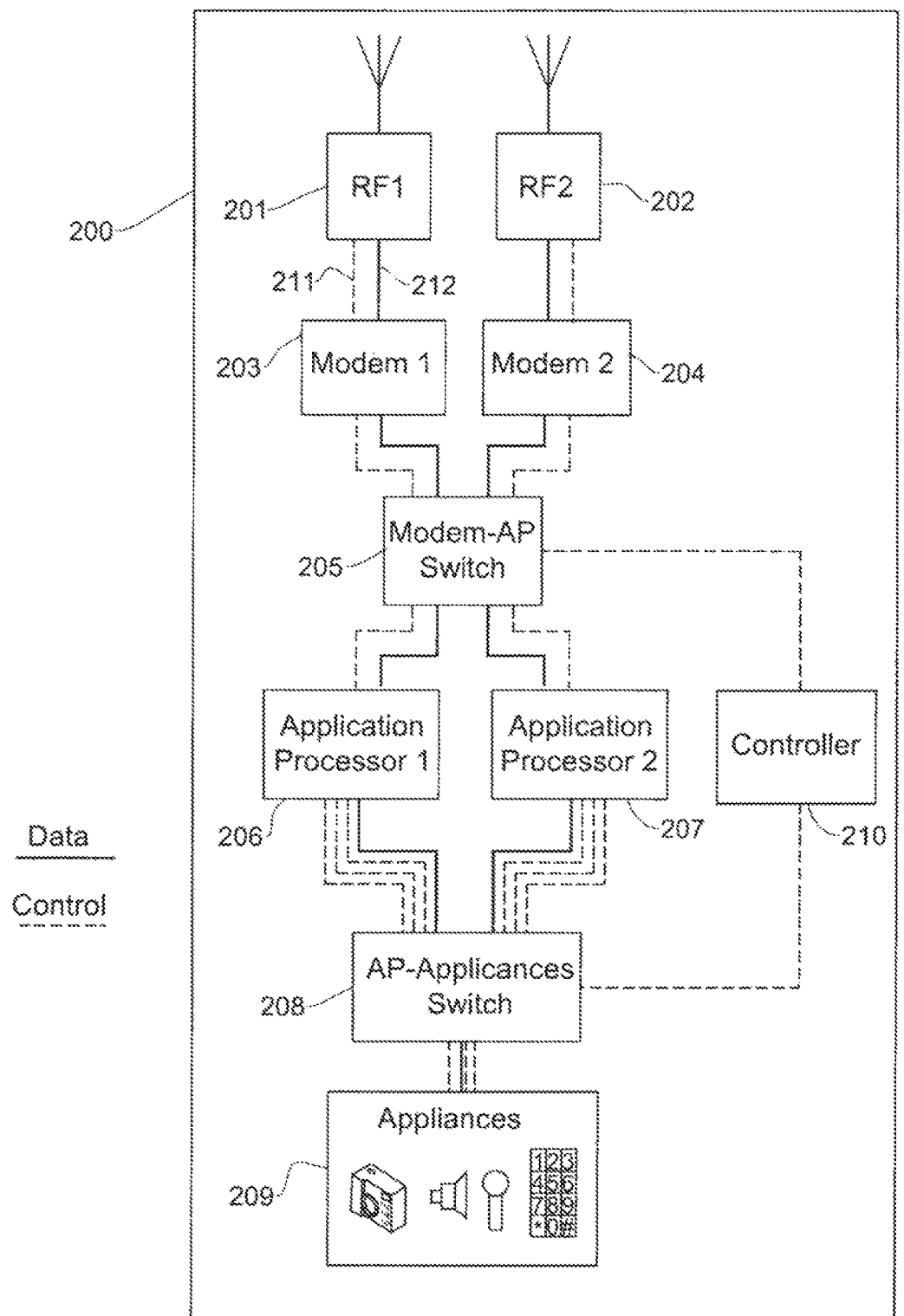
FIG. 2 is a schematic illustration of cellular device system architecture in accordance with a certain embodiment of the invention.

Bearing this in mind, attention is now drawn to FIG. 2 illustrating cellular device system 200 architecture in accordance with a certain embodiment of the invention. As shown, the system includes a plurality of RF front-ends (by this embodiment only antennae 201 and 202 coupled to modems 203 and 204, respectively). The modems are coupled to Modem-AP (Modem to Application Processor) Switch 205, which in turn is coupled to a plurality of application processors (by this embodiment application processors 206 and 207), both coupled to AP-Appliance (Application Processor to Appliance) Switch 208, which in turn is coupled to a plurality of appliances such as camera, speaker, or keyboard designated collectively as 209. As also shown in FIG. 2, there is provided a controller module 210 coupled to the said switches 205 and 208 for receiving controls and sending commands to either or both of them for selecting a processing route, which employs either of application processors 206 and 207. The selection of the desired route depends on the incoming data that is received by AP-Appliances Switch 208 (from one or more appliances, for instance in response to user command), and/or from data received by Modem-AP Switch 205 (and as received by an antenna of the antennae array 200'), all as will be explained in greater detail below.

Figure 3:
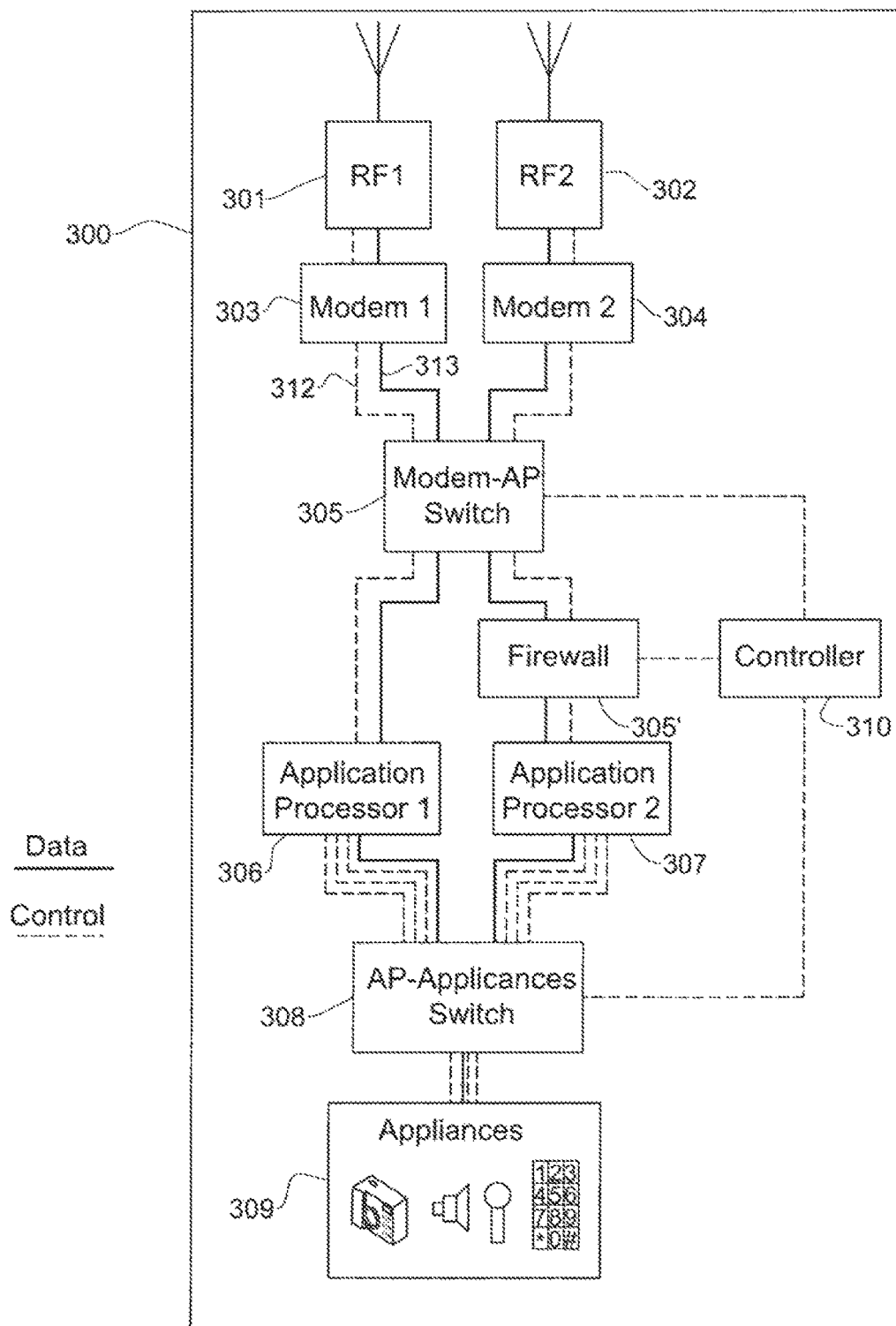
FIG. 3 is a schematic illustration of cellular device system architecture in accordance with a certain other embodiment of the invention.

Attention is now drawn to FIG. 3 illustrating schematically a cellular device system architecture 300 in accordance with a certain other embodiment of the invention. Note that elements 300', 301, 302, 303, 304, 305, 306, 307, 308 309 and 310 correspond to elements 200', 201, 202, 203, 204, 205, 206, 207, 208 209 and 210, and therefore their structure and operation will not be further described herein. Also shown in FIG. 3 is application pre-processing module 305', which forms part of a processing route that includes Application Processor 307. By the example of FIG. 3, the pre-processing module 305' is a firewall serving for screening and preventing penetration of malicious content, for example in banking applications. The pre-processing module 305' is also connected to the Controller module 310, both for sending relevant information and instructing commands. For instance, if the firewall 305' detects malicious content, it sends appropriate indication to controller 310, and the latter, based on the so received indication, may for instance command firewall 305' to block transmission of received data to the selected Application processor 307.

In the latter example, the processing route that includes Application processor 306 may be selected by controller module 310 in response to, e.g., inquiry of data of general non-sensitive or low-priority nature as received by the AP-Appliance Switch 308 (e.g. from the user). Alternatively, the processing route that includes Application Processor 307 (and pre-processor 305') is selected by Controller module 310 in response to, e.g., inquiry of data of sensitive or high-priority nature (e.g., buy/sell instructions) as received by the AP-Appliance Switch 308 (e.g., from the user).

Figure 4:
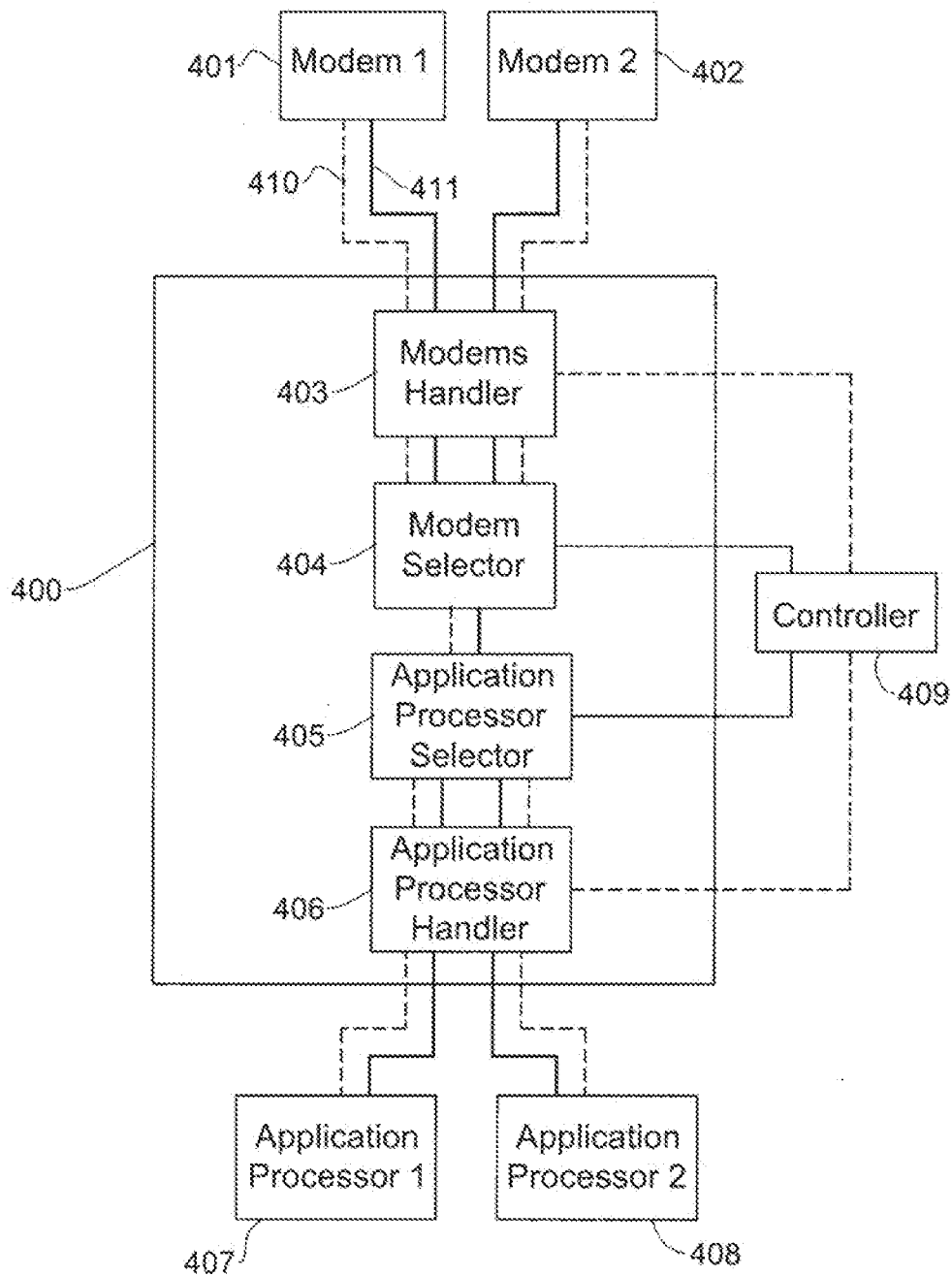
FIG. 4 is a schematic block diagram of a Modems-to-Application Processors Switch, in accordance with certain embodiments of the invention.

Attention is now directed to FIG. 4 illustrating a schematic block diagram of a Modem-AP Switch (e.g., Modem-AP Switch 305 of FIG. 3), in accordance with certain embodiments of the invention. The specified switch includes modem handler 403 configured to connect to at least one modem (by this example modems 401 and 402). The specified modems may be adapted to operate, e.g., in 3G or 4G protocols. The modem handler 403 will implement the interface to all the modems connected to it. The interface includes control signals 410 (such as AT-Commands) and traffic signals 411. By probing all modems connected to it, the Modem Handler supports the Controller 409 to connect one of the specified modems by means of modem selector 404 in response to commands received from the Modems (e.g., 401 and 402). In a similar fashion, Application Processors Handler 406 implements the interface to the application processors connected to it (e.g., 407 and 408). This interface includes command and control signals for the application processor to send/receive to/from the modems. These signals derive the needed route configuration, and therefore select one of the specified Application Processors 407 or 408 by the Application Processor Selector 405. The Application Processors Handler 406 will connect one of the specified application processors by means of Application Processor Selector 405 in response to commands received from Controller 409. The Controller 409 receives data from Modems Handler 403, wherein the data is received by antenna and its associated modem (see FIG. 2) that is connected to the Modems Handler 403. The Controller further receives data from Application Processors Handler 406 as sent by the Application Processor connected to the Application Processors Handler 406, wherein the data originates, for example, from the user through the appropriate appliance or is generated internally by the application processor. Based on either the data received from Modems Handler 403 and/or data received from Application Processors Handler 406, the controller can command either or both of selectors 404 and 405 to connect a given modem to a given application processor, thereby forming the specified desired selected processing route. Note that the data that affects the decision of the controller to command the selectors in the manner specified may be of various types. Thus, by way of non-limiting example, the data as received from the modem handler may be the session type as received from the modem. The session type may be, for example, an SMS session, or voice-call session, or data session. Other data types may be, for example, the operating modem indication (which modem is currently active) or any identity type of the incoming session (such as the incoming phone number, IP address, MAC address, etc.).

The data as received by the Controller 409 from Application Processors Handler 406 may be from various types, e.g., application type (such as voice-call, SMS or data) or active application processor indication or service priority level, etc. The utilization of the specified data for commanding the selectors to select the appropriate modem or application processor that form a processing route will be described by way of example only with reference to FIGS. 6 and 7 below.

Figure 5:
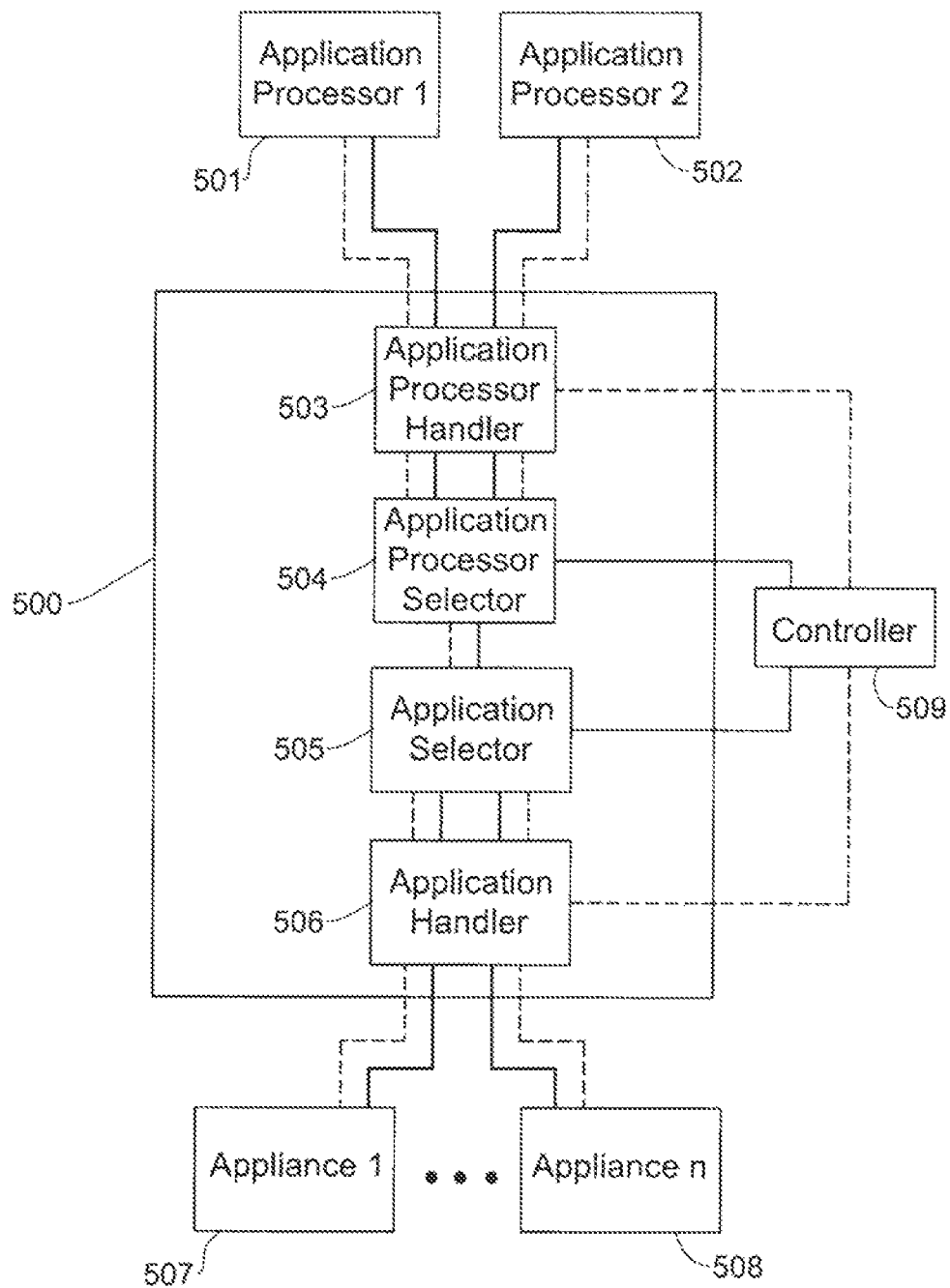
FIG. 5 is a schematic block diagram of an Application Processors-to-Appliances Switch, in accordance with certain embodiments of the invention.

Turning now to FIG. 5, it illustrates a schematic block diagram of AP-Appliances Switch 500 (e.g., switch 308 of FIG. 3), in accordance with certain embodiments of the invention. Note that the structure of the AP-Appliances Switch is very similar to that of the Modem-AP switch of FIG. 4, except for the fact that the Application Processors Handler is connected to the application processors 501 and 502 (being of course identical to application processors 407 and 408) and the Appliances Handler 506 is connected to Appliance 1 to Appliance n. (of which two are marked as 507 and 508). Based on data received from the Application Processors Handler 503 and/or based on data received from the Appliances Handler 506, the Controller 509 will select the appropriate application processor and appliances that form part of the specified processing route. Note that the selection by the Controller 509 of a given application processor can take into account, in a coordinated fashion, the data retrieved from Application Processors Handlers 406 and 503 and data from any other mentioned handler connected to it. It should be emphasized that the Application Processor Handler 406 of FIG. 4 implements the interface between the application processors and the modems (e.g., the interface includes control signals such as AT-Commands that are designated to the selected application processor) and that Application Processors Handler 503 of FIG. 5 implements the interface between the application processors and each one of the various appliances. The Controller 509 (409) synchronizes the two Application Processors Handlers to prevent collision or uncorrected mutual commands to the application processors.

Figure 6:
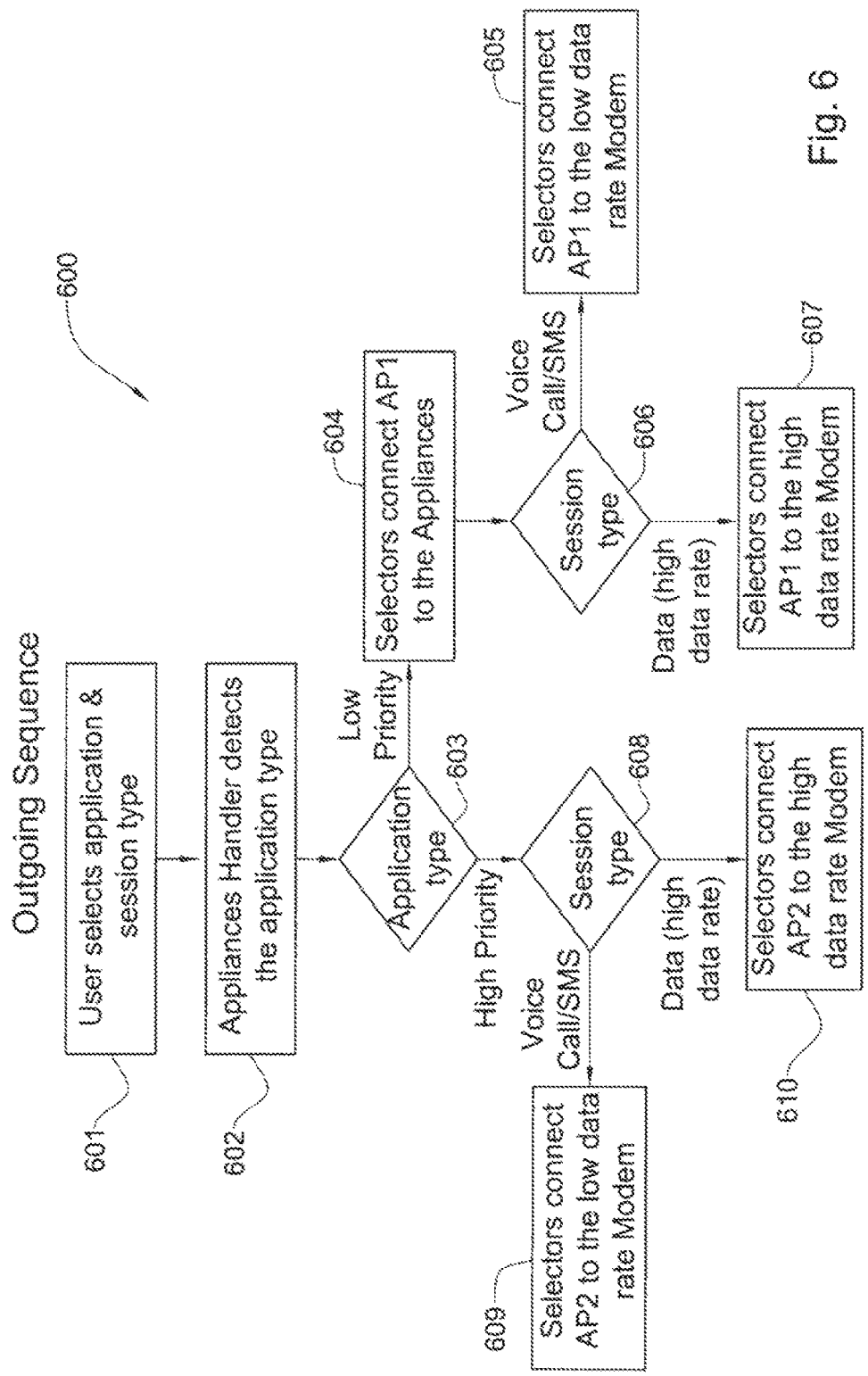
FIG. 6 illustrates a flow chart of a sequence of operations of the controller module for outgoing session, in accordance with certain embodiments of the invention.

Attention is now drawn to FIG. 6, which illustrates a flow chart of a sequence of operations of a Controller module (i.e., 310 of FIG. 3), in accordance with certain embodiments of the invention.

Turning at first to sequence 600, it describes an outgoing sequence of operation. By this particular example, the user selects an application and session types 601, which is detected (in this sequence example) by the Appliances Handler (part of the AP-Appliance Switch) 602 and read by the Controller. A data type can be, for example, an indication of the desired phone number.

Based on the so read data, e.g., application type 603, indicating that the destination call is a service/destination (e.g., bank) of higher priority, or alternatively of another service/destination of lower priority, further decisions are made of. Thus, in the case of lower priority, the Controller commands the Application Processor Selectors (405 & 504) to select, i.e., application processor #1 (AP1) that is assigned for running lower priority applications/services/destinations (604). Then the session type (being another example of detected data) is checked (606). If the session type is a voice message or SMS, the controller commands the modem switch to select a low data rate modem (605). Alternatively, if the session type is data of high data-rate, it requires higher transmission rates, and accordingly the Controller commands the Modem-AP Switch to select a high data-rate modem (606). Reverting now to stage 603, if the data type (e.g., telephone number) indicates higher priority (e.g., the desired destination is a bank), then the Controller commands the Application Processor Selectors (405 & 504) to select AP2 assigned to higher priority tasks (and possibly requiring application of a pre-processor application such as a firewall). Thereafter, another data type is checked (session type) 608, and similar to the low-priority options, an appropriate modem is selected depending upon the desired transmission rate (stages 609 and 610).

The invention is of course not bound to checking the specified data types in order to decide on the selected modem and/or application processor and/or appliances that forms part of the selected processing route. Note also that the controller can receive data from one or more of the specified Handlers (by the specific embodiments of FIGS. 4 and 5 403, 406, 503 and 506) and process the specified data for selecting a desired processing route.

Figure 7:
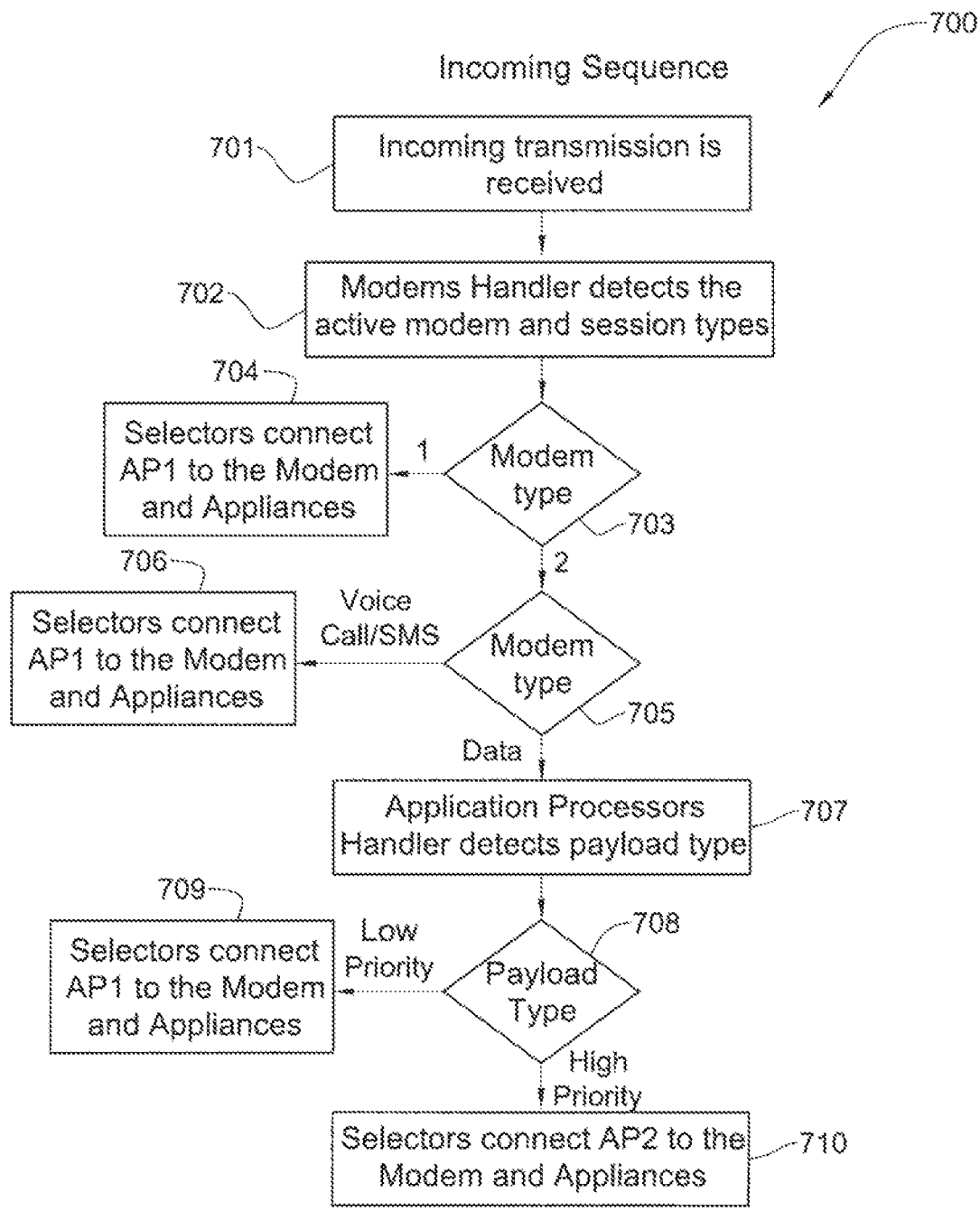
FIG. 7 illustrates a flow chart of a sequence of operations of the controller module for incoming session, in accordance with certain embodiments of the invention.

Turning now to FIG. 7, it illustrates a flow chart of a sequence of operations of a Controller module, in accordance with certain embodiments of the invention. Thus, sequence 700 describes an incoming sequence of operations.

As shown, incoming data is received 701, and the modem handler detects which modem is active based on the data type received (e.g., Bluetooth data transmissions, or for instance 4G data transmissions) 702. Based on the detected data, the Controller may already at this stage command selection of the appropriate Application processor. For instance, Bluetooth transmissions may indicate a lower sensitivity/priority, and accordingly the lower sensitivity/priority application processor is selected (703 and 704). In case of other data types (e.g., the data transmissions received through the 4G modem, indicating a higher sensitivity/priority), another data type is tested (e.g., session type 705) before a decision is made which application processor to select. Thus, for instance, in the case of lower data-rate requirement, such as SMS or voice-call, the lower sensitivity/priority (capable also of processing lower computationally demanding tasks) is selected 706, whereas in the case of data, if the Application Processors Handler detects another data type (i.e., payload information such as IP header, etc.) 707, another test is performed. The payload may stand, for example, also for a certain signature incorporated in the data, in the case that the specified signature indicates high priority and then the more demanding application processor is selected (say capable of processing heavy computational robust tasks) 710, whereas in the case of lower sensitivity/priority, the lesser demanding application processor is selected 709.

Those versed in the art will readily appreciate that the various stages illustrated in FIG. 7 are by no means binding. Thus, for instance, the various types of data, as well as the distinction of application processor to higher/lower computational power, are given for illustrative purposes only.

Figure 8:
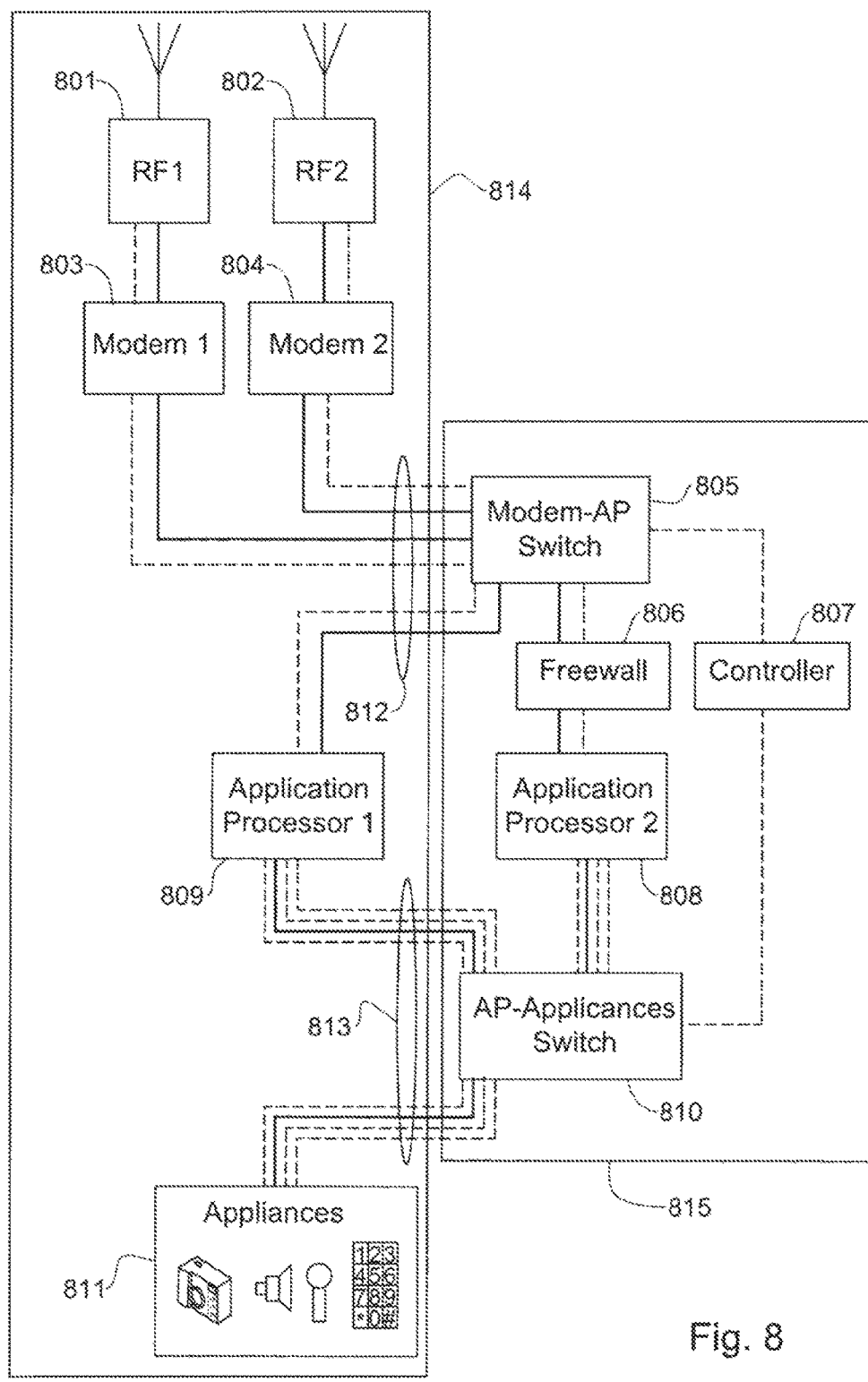
FIG. 8 illustrates additional cellular device architecture where the new apparatus is a separated add-on unit to a typical cellular device, in accordance with certain embodiments of the invention.

Attention is now drawn to FIG. 8, illustrating implementation architecture and exemplary processing routes, in accordance with certain embodiments of the invention. It is shown that the additional application processor (Application Processor 2 808) and the relevant Switches (805 and 810) and Controller 807 are implemented as a separated add-on unit 815 to typical cellular device 814. The interfaces between the typical cellular device 814 and the additional switched application processor add-on unit 815 include modems to application processors interface 812 and application processors to appliances interface 813.

Thus, for example, a given processing route (as prescribed by controller 807) includes antenna RF1 and its associated Modem 1 (801 and 803), Application Processor 1 809 and given appliance or appliances (as selected by the user from the possible set of Appliances 811). In accordance with a certain other example, another processing route is prescribed by Controller 807, and it includes antenna RF2 and its associated Modem 2 (802 and 802), Pre-processing Application 806 (e.g., firewall), Application Processor 2 808 and given appliance or appliances (as selected by the user from the possible set of Appliances 811).

Other variants are applicable (e.g., including modem 1 803 and AP2 808).

It should be further noted that the components that constitute a processing route do not necessarily include a Modem (and its associated antenna), Application Processor and Appliance. Moreover, the invention is not bound by the type of each of the specified components (e.g., RF antenna). Note also that the system architecture of FIG. 8 and the split of components to the various units are by no means binding.

The present invention has been described with a certain degree of particularity, but those versed in the art will readily appreciate that various alternations and modifications may be carried out without departing from the scope of following claims:

The invention claimed is:

1. A cellular device architecture, comprising:
 a Modem-AP switch configured to select between different processing routes;
 a first application processor adapted for processing a first type of data and selectively connected to said Modem-AP switch;
 a second application processor adapted for processing a second type of data and selectively connected to said Modem-AP switch;
 at least two modems selectively connected to said Modem-AP switch, each of said modems communicating with a respective antenna; and
 a Controller module coupled to said Modem-AP switch and being configured to:
  detect whether received data is said first type of data or said second type of data; and
  select a processing route having one of the two application processors that matches the detected type of data, said selection comprising:
   in response to receipt of data of said first type of data received in said Modem-AP switch as received at one of said modems through an associated antenna, commanding said Modem-AP switch to select a first processing route wherein said first application processor is switched to connect to said modem and to its associated antenna, and said second application processor is not in said first processing route; and
   in response to receipt of data of said second type of data received in said Modem-AP switch as received at one of said modems through an associated antenna, commanding said Modem-AP switch to select a second processing route wherein said second application processor is switched to connect to said modem and to its associated antenna, and said first application processor is not in said second processing route.

2. The cellular device architecture according to claim 1, wherein said two processors are further connectible through an AP-Appliance Switch to at least two appliances and wherein the Controller module is coupled to at least said switches and is configured, in response to receipt of data received in said AP-Appliance Switch as originated from an appliance or receipt of data in said Modem-AP switch as received through an antenna, to command either or both of said switches to select a processing route wherein one of said application processors is switched to connect to one of said modems and to its associated antenna, and to at least one of said appliances.

3. The cellular device architecture according to claim 1, wherein said Controller is configured to command said Modem-AP Switch to select a processing route wherein one of said application processors is switched to connect to one of said modems and to its associated antenna.

4. The cellular device architecture according to claim 2, wherein said Controller is configured to command said AP-Appliance Switch to select a processing route wherein one of said application processors is switched to connect to at least one of said appliances.

5. The cellular device architecture according to claim 1, wherein at least one of said modems and its associated antenna is configured to operate in any one of: 4G protocol; 3G protocol; WiFi; Bluetooth; and 2G/GSM protocol.

6. The cellular device architecture according to claim 1, wherein at least one of said application processors is associated with an additional pre-processing application processor, which forms part of the processing route that includes said one application processor.

7. The cellular device architecture according to claim 1, wherein one of said application processors is adapted for sensitive bank transactions and wherein in response to received data that pertains to sensitive bank transactions, said Controller module is configured to select a processing route that includes said bank application processor.

8. The cellular device architecture according to claim 7, wherein said bank application processor is associated with a pre-processing firewall application processor.

9. The cellular device architecture according to claim 1, wherein the data in said AP appliance switch, as originated from an appliance, includes at least one of the following: phone number, session type, payload type and any internal payload information.

10. The cellular device architecture according to claim 1, wherein the data in said Modem-AP Switch as received from the associated antenna includes modem type, session type, and source identity.

11. The cellular device architecture according to claim 10, wherein said modem type includes at least one of the following: WiFi, Bluetooth, 2G, 3G, 4G.

12. The cellular device architecture according to claim 10, wherein the session type includes at least one of the following: voice-call, SMS, data.

13. The device according to claim 10, wherein the source identity includes a telephone number.

14. The cellular device architecture according to claim 2, wherein an additional application processor and Modem-AP Switch and Pre-processor application and AP-Appliances Switch and Controller module are implemented as an add-on separate unit connectible to a cellular device.

15. The cellular device architecture according to claim 1, wherein the Modem-AP switch includes a modem handler configured to connect to at least one modem and is adapted to implement an interface to the at least one modem connected thereto.

16. The cellular device architecture according to claim 15, wherein the interface includes control signals and traffic signals.

17. The cellular device architecture according to claim 15, wherein the Modem Handler supports the Controller to connect one of said modems by means of modem selector, in response to commands received from the modems.

18. The cellular device architecture according to claim 1, wherein the Modem-AP switch includes an Application Processor Handler configured to connect to at least one application processor and is adapted to implement an interface to the at least one application processor connected thereto.

19. The cellular device architecture according to claim 18, wherein the interface includes command and control signals that the application processor send to or receive from said modems.

20. The cellular device architecture according to claim 18, wherein the Application Processor Handler is configured to connect one of the specified application processors by means of Application Processor Selector in response to commands received from the Controller module.

21. The cellular device architecture according to claim 15, wherein the switch includes an Application Processor Handler configured to connect to at least one application processor and is adapted to implement an interface to the at least one application processor connected thereto; and wherein based on either the data received from the Modem Handler and/or data received from Application Processor Handler, the controller module being configured to command either or both of the modem selector or AP selector to connect a given modem to a given application processor, thereby forming a selected processing route.

22. The cellular device architecture according to claim 15, wherein data as received from the modem handler being a session type as received from the modem.

23. The cellular device architecture according to claim 15, wherein data as received from the modem handler being the operating modem indication or any identity type of an incoming session.

24. The cellular device architecture according to claim 18, wherein data as received by the Controller module from the Application Processor Handler being of a type selected from a group that includes application type, active application processor indication and service priority level.

25. The cellular device architecture according to claim 2, wherein the AP-Appliance switch includes an application processor handler configured to connect to at least one application processor and is adapted to implement an interface to the at least one application processor connected thereto.

26. The cellular device architecture according to claim 25, wherein the AP-Appliance switch includes an Appliances Handler configured to connect to at least one appliance and is adapted to implement an interface to the at least one application processor connected thereto.

27. The cellular device architecture according to claim 26, wherein based on data received from the Application Processors Handler and/or based on data received from the Appliances Handler, the Controller module is configured to select an appropriate application processor and appliances that form part of the processing route.

28. The cellular device architecture according to claim 27, wherein said selection of an application processor takes into account, in a coordinated fashion, data retrieved from said handlers.

29. In a cellular device architecture that includes two application processors connectible through a Modem-AP Switch to at least two modems each communicating with a respective antenna, a method comprising:
   detecting whether received data is a first type of data or a second type of data; and
   selecting a processing route having one of the two application processors that matches the detected type of data, said selecting comprising:
   (a) in response to receipt of data of the first type in said Modem-AP switch as received through an antenna, commanding said switch to select a first processing route wherein one of said application processors is switched to connect to one of said modems and to its associated antenna; and
   (b) in response to receipt of data of the second type in said Modem-AP switch as received through an antenna, commanding said switch to select a second processing route wherein the other one of said application processors is switched to connect to one of said modems and to its associated antenna.

30. The method according to claim 29, wherein said application processors are further connectible through an AP-Appliance Switch to at least one appliance, said method further comprising, in response to receipt of data in said AP-Appliance Switch as originated from an appliance or receipt of data in said Modem-AP switch as received through an antenna, commanding either or both of said switches to select a processing route wherein one of said application processors is switched to connect to one of said modems and to its associated antenna and to at least one of said appliances.

31. The method according to claim 29, wherein at least one of said modems and its associated antenna is configured to operate in any one of: 4G protocol; 3G protocol; WiFi; Bluetooth; and 2G/GSM protocol.

32. The cellular device architecture according to claim 1, wherein said first type of data is at least one of: sensitive data; and high-priority data.

33. The cellular device architecture according to claim 1, wherein said first type of data is at least one of: data from a particular source; data having a particular transmission rate; data of a particular session type; data of a particular bit-rate; data of a particular application type; data of a particular identity type; and payload information.

34. The method according to claim 29, wherein said first type of data is at least one of: sensitive data; and high-priority data.

35. The method according to claim 29, wherein said first type of data is at least one of: data from a particular source; data having a particular transmission rate; data of a particular session type; data of a particular bit-rate; data of a particular application type; data of a particular identity type; and payload information.

* * * * *